US009386450B1

(12) United States Patent
Kennedy

(10) Patent No.: US 9,386,450 B1
(45) Date of Patent: Jul. 5, 2016

(54) SYSTEM AND METHOD FOR AUTHENTICATION UTILIZING A PHYSICAL BREAK IN AN ELECTRONIC PATHWAY

(71) Applicant: John C. Kennedy, San Diego, CA (US)

(72) Inventor: John C. Kennedy, San Diego, CA (US)

( * ) Notice: Subject to any disclaimer, the term of this patent is extended or adjusted under 35 U.S.C. 154(b) by 22 days.

(21) Appl. No.: 14/689,124

(22) Filed: Apr. 17, 2015

Related U.S. Application Data

(60) Provisional application No. 62/143,220, filed on Apr. 6, 2015.

(51) Int. Cl.
*H04W 12/06* (2009.01)
*H04W 12/08* (2009.01)
*H04W 12/04* (2009.01)

(52) U.S. Cl.
CPC .............. *H04W 12/06* (2013.01); *H04W 12/04* (2013.01); *H04W 12/08* (2013.01)

(58) Field of Classification Search
CPC ........ H04L 9/32; H04L 9/3226; H04L 9/3228
USPC .................................................... 726/4, 7, 10
See application file for complete search history.

(56) References Cited

U.S. PATENT DOCUMENTS

2003/0234719 A1* 12/2003 Denison ............ G07C 9/00309 340/5.23
2004/0010706 A1* 1/2004 Stevens ................. G06Q 10/08 726/4
2008/0016558 A1 1/2008 Aull et al.
2010/0022217 A1* 1/2010 Ketari ................ H04M 1/6066 455/411
2010/0306549 A1* 12/2010 Ullmann ........... G07C 9/00103 713/185
2011/0276609 A1* 11/2011 Denison ............... G07F 11/002 707/812
2012/0167195 A1 6/2012 McQuaide, Jr.
2013/0246261 A1 9/2013 Purves et al.
2013/0346302 A1 12/2013 Purves et al.
2014/0331051 A1 11/2014 Fascenda
2014/0372762 A1 12/2014 Flautner et al.
2015/0026049 A1 1/2015 Theurer et al.
2015/0036825 A1* 2/2015 Tanizawa et al. ............ 380/279

OTHER PUBLICATIONS

Keyless entry system with radio card transponder [automobiles], Hirano et al, IEEE, 1998.*
Evaluating access control locks against low technology attacks, Hounsham et al, IEEE, 2009.*

* cited by examiner

*Primary Examiner* — Luu Pham
*Assistant Examiner* — Jahangir Kabir
(74) *Attorney, Agent, or Firm* — Clause Eight IPS; Michael Catania

(57) ABSTRACT

A system and method for authentication utilizing a physical break in an electronic pathway is disclosed herein. The system includes a primary device, a secondary device and an authentication server. The authentication server transmits a key and a solution to the primary device and a key cylinder to the secondary device The secondary device requires a physical action to close a circuit in order to send the key cylinder to the primary device, which when matched to the key and solved, authenticates the primary device.

6 Claims, 9 Drawing Sheets

SYSTEM AND METHOD FOR AUTHENTICATION UTILIZING A PHYSICAL BREAK IN AN ELECTRONIC PATHWAY

CROSS REFERENCE TO RELATED APPLICATION

The Present application claims priority to U.S. Provisional Patent Application No. 62/143,220, filed on Apr. 6, 2015, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to electronic authentication.

2. Description of the Related Art

Many of the emerging applications require, or will require a level of security and authentication to be practical. These applications might include mobile banking, social networking, transferring of personal data, verification of identity, granting of access, etc. Consumers and businesses alike need easy to use but highly secure methods for authenticating that a specific device, person, or account, is entering a specific transaction, connection, contract, physical location, or application. For example, in mobile banking, it is important to know that money would be transferred securely between only the parties intended. Convention banking, legal contracts, and everyday personal communications have used personal signatures to authenticate transactions and prevent fraud effectively for centuries. A similarly effective, time-tested, universal method for authentication in the digital world of electronic transactions is needed. Additionally, the use of physical locks and keys, electronic locks with PINs, security codes and passwords, iris scans, and fingerprint readers, are cumbersome and intrusive, and not user friendly. An easier, less cumbersome, universal system that allows similar or better levels of security, authentication, and access as do these traditional security methods is needed but non-existent.

Remote authentication is a problem. When a secure site receives a request for secure data or access to the secure site over a network from a remote location, the secure site must be certain that the requestor has authorization to access the site or receive the data. Widespread theft of passwords and other electronic authentication mechanisms has rendered secure sites vulnerable to fraud and theft of sensitive information.

The prior art discusses various techniques for remote authentication.

General definitions for terms utilized in the pertinent art are set forth below.

Beacon is a management frame that contains all of the information about a network. In a WLAN, Beacon frames are periodically transmitted to announce the presence of the network.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Media Access Control (MAC) Address is a unique identifier assigned to the network interface by the manufacturer.

Organizationally Unique Identifier (OUI) is a 24-bit number that uniquely identifies a vendor, manufacturer, or organization on a worldwide basis. The OUI is used to help distinguish both physical devices and software, such as a network protocol, that belong to one entity from those that belong to another.

Probe Request: A frame that contains the advertisement IE for a device that is seeking to establish a connection with a proximate device.

Probe Response: A frame that contains the advertisement IE for a device. The Probe Response is sent in response to a Probe Request.

SSID (Service Set Identifier) is a 1 to 32 byte string that uniquely names a wireless local area network.

Transfer Control Protocol/Internet Protocol ("TCP/IP") is a protocol for moving files over the Internet.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

Wireless AP (access point) is a node on the wireless local area network (WLAN) that allows wireless devices to connect to a wired network using Wi-Fi, or related standards.

There is a need for a mechanism that permits electronic authentication with a physical safety component.

BRIEF SUMMARY OF THE INVENTION

The present invention provides a solution to remote authentication.

One aspect of the present invention is a system for authentication utilizing a physical break in an electronic pathway. The system includes a primary device, a secondary device and an authentication server. The primary device comprises a wireless transceiver. The secondary device comprises a first section and a second section. The first section is movable in relation to the second section. The first section comprises a first electrical connector, a GPS component, a transceiver for receiving authentication data over a network and a memory for storing the authentication data. The second section comprises a second electrical connector, a wireless transceiver for communicating with the primary device. The authentication server comprises a key and a key cylinder. The key comprises a combination of numbers, letters and/or symbols and the key cylinder comprises a combination of numbers, letters and/or symbols. The primary device is configured to transmit an authentication request to the authentication server. The authentication server is configured to transmit a request to the secondary device in response to the authentication request. The secondary device is configured to transmit a GPS location and a UUID to the authentication server. Upon validation of the transmission from the secondary device, the authentication server is configured to transmit the key and a solution to the primary device and the key cylinder to the secondary device. The first section is configured to position the first electrical connector in contact with the second electrical connector to close a circuit. The secondary device is configured to transmit the key cylinder to the primary device when the circuit is closed. The primary device is configured to match the key with the key cylinder and test the solution to authenticate the primary device to gain access for the authentication request.

Another aspect of the present invention is a method for authentication utilizing a physical break in an electronic pathway. The method includes transmitting an authentication request from a primary device to an authentication server. The method also includes transmitting a request to a secondary device for identification in response to the authentication request. The method also includes transmitting a GPS location and a UUID to the authentication server. The method also includes transmitting from the authentication server a key and a solution to the primary device and a key cylinder to a wireless transceiver of a first section of the secondary device upon validation of the secondary device. The method also includes storing the key cylinder in a memory of the first section of the secondary device. The method also includes positioning a first electrical connector of the first section of the secondary device in contact with a second electrical connector of a second section of the secondary device to close a circuit. The method also includes transmitting the key cylinder from a wireless transceiver of the second section of the secondary device to a wireless transceiver of the primary device when the circuit is closed on the secondary device. The method also includes matching the key with the key cylinder at the primary device and testing the solution to authenticate the primary device to gain access for the authentication request.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
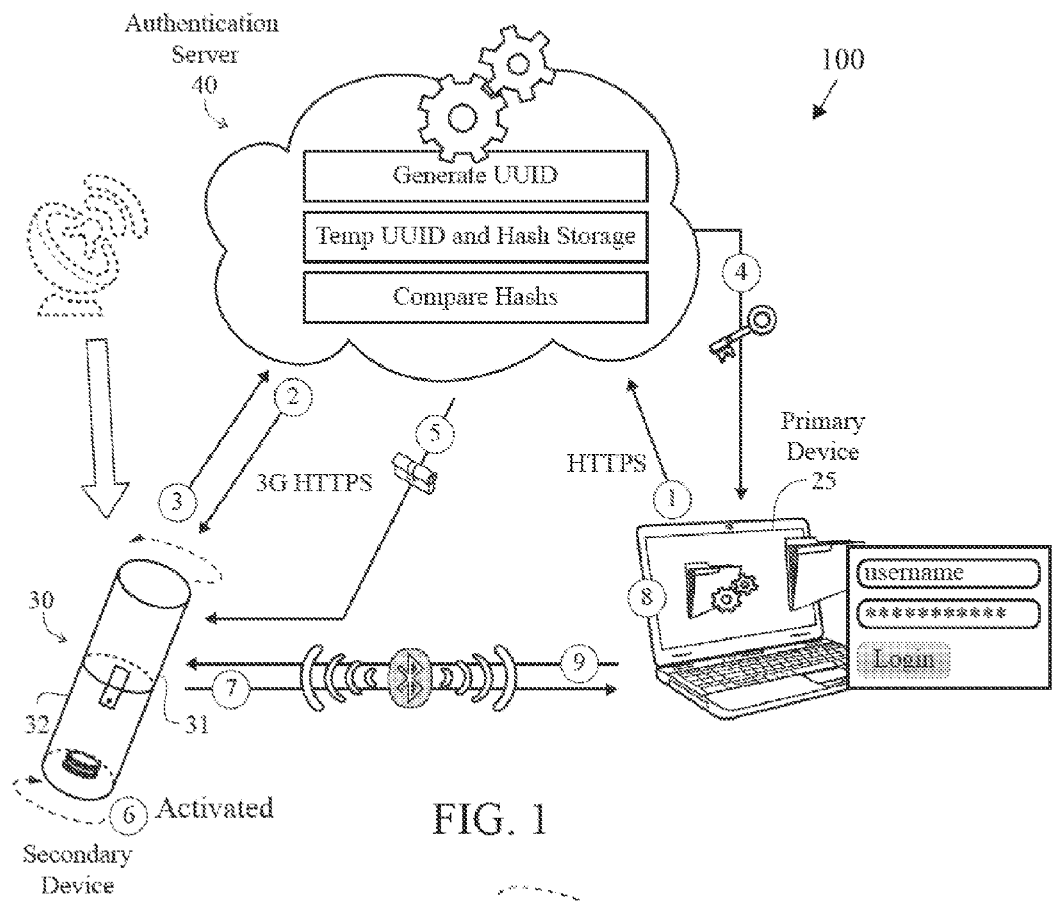
FIG. 1 is a block diagram of system for authentication utilizing a physical break in an electronic pathway.
Figure 1A:
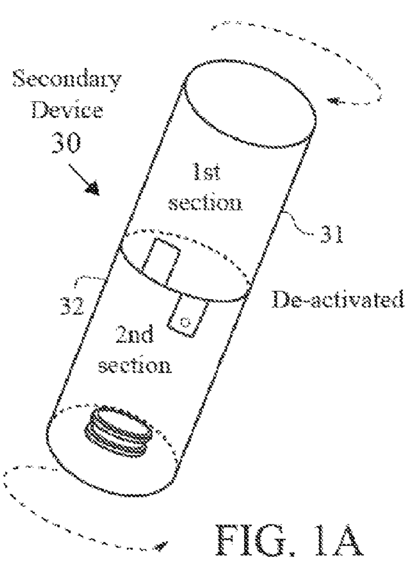
FIG. 1A is an isolated view of secondary/slave device for a system for authentication utilizing a physical break in an electronic pathway.
Figure 2:
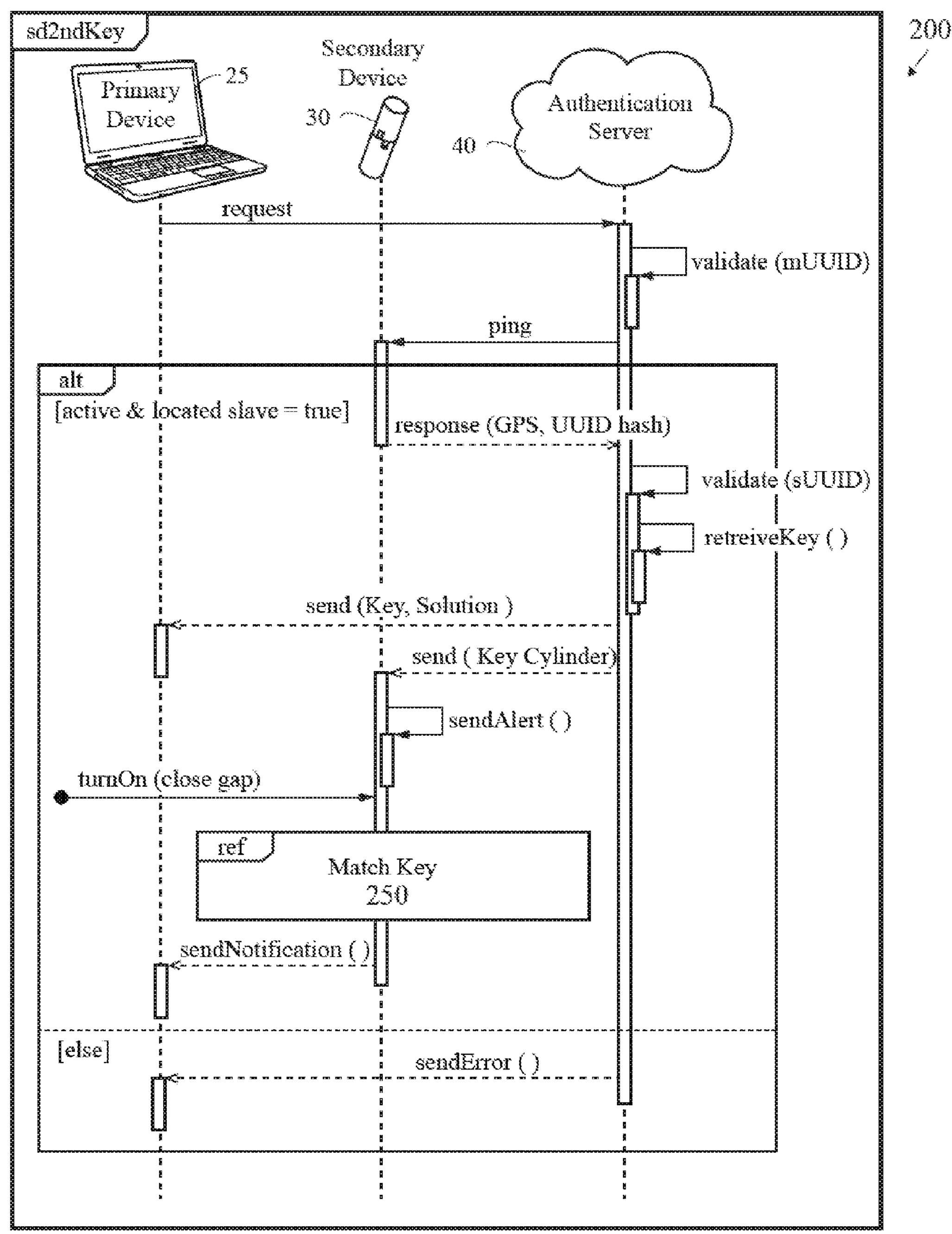
FIG. 2 is a communication sequence diagram for authentication utilizing a physical break in an electronic pathway.
Figure 2A:
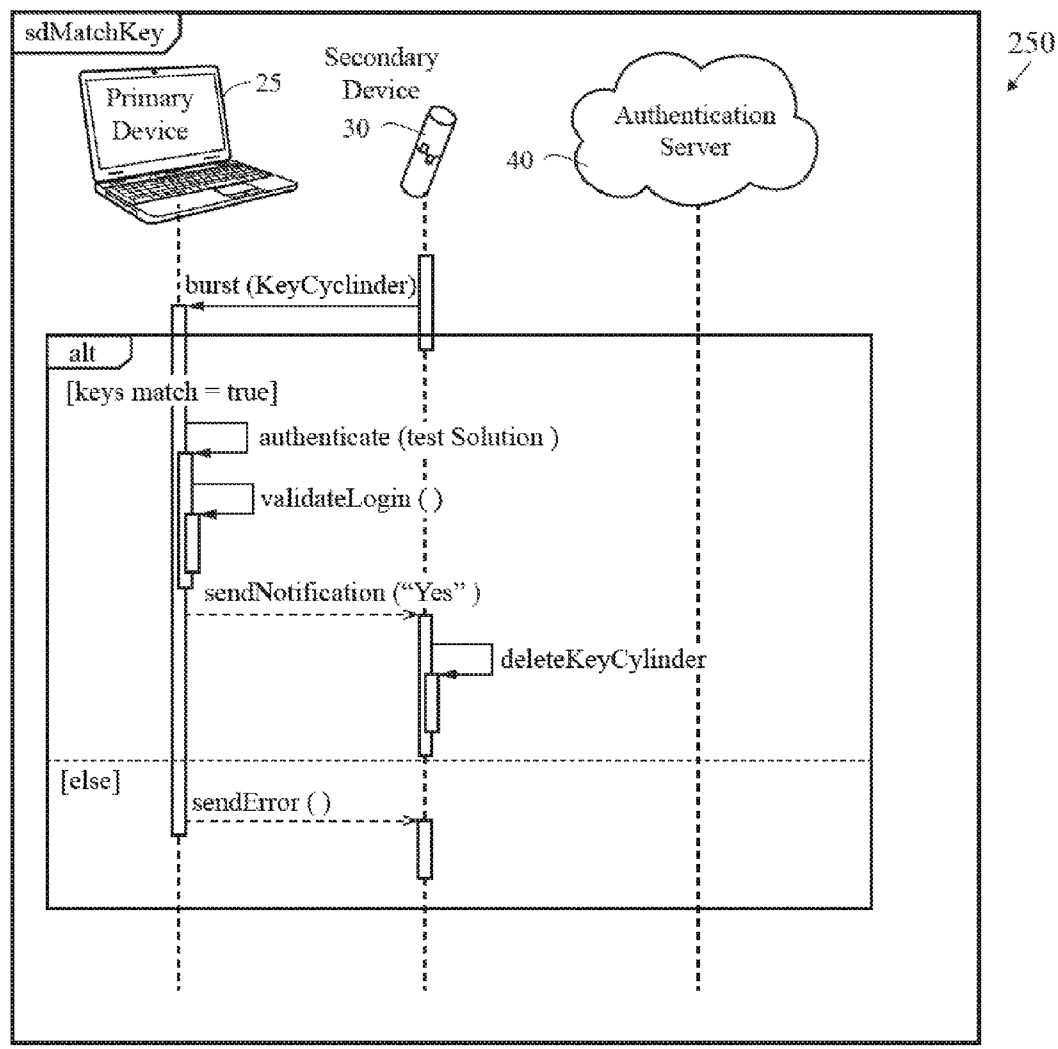
FIG. 2A is a communication sequence diagram for matching a key to a key cylinder.

FIG. 1 is a block diagram of system 100 for authentication utilizing a physical break in an electronic pathway. The system 100 preferably includes a primary device 25, a secondary device 30 and an authentication server 40. The primary device 25 comprises a wireless transceiver. The primary device 25 is preferably a computer such as a laptop computer, or a mobile communication device such as a mobile phone or a tablet computer. The secondary device 30 comprises a first section 31 and a second section 32. The secondary device 30 shares no persistent connection to the primary device 25. The secondary device 30 may take the form of a stand-alone item, or component of a larger item, with a variety of features including the capability of transmitting and receiving data used to validate its own absolute position and its relative position with respect to the primary device 25, and the secondary device 30 is configured to receive authentication data from the authentication server 40 and store the authentication data in the first section 31 and isolate the authentication data from the second section 32 which is the only section of the secondary device 30 capable of transmitting to the primary device 25. In this manner, the secondary device 30 provides a physical break in the electronic pathway of authentication.

As shown in FIGS. 1, 1A, 2 and 2A, the primary device 25 transmits an authentication request over a network to an authentication server 40. The request is preferably sent as a HTTPS request sent over the Internet. For example, the authentication request is sent from a web connected source (e.g., connected over a WiFi network through a wireless access point) that requires a user name and/or password for access. Alternatively, the request is sent as a text over a cellular network, or an email. In response to the authentication request, the authentication server 40 sends a request to the secondary device 30 for identification. The secondary device 30 transmits a GPS location and a UUID to the authentication server. The authentication server 40 then transmits a key and a solution to the primary device 25, and the authentication server 40 transmits a key cylinder to the secondary device 30 upon validation of the secondary device 30 by the authentication server based on the GPS location and the UUID. The key cylinder is stored in a memory of the first section 31 of the secondary device 30. Alternatively, location is determined for the primary device 25 using a mobile data network, through the network location service, which utilizes triangulation, nearest cell tower data, or the like to provide an approximate geographical location of the primary device 25 (if the device is a mobile phone or cellular connected table t computer). The mobile data network transmits the approximate geographical location of the primary device 25 to the authentication server 40.

For example, on an IPHONE® device from Apple, Inc., the "UDID," or Unique Device Identifier is a combination of forty numbers and letters, and is set by Apple and stays with the device forever.

For example, on an ANDROID based system, one that uses Google Inc.'s ANDROID operating system, the ID is set by Google and created when an end-user first boots up the device. The ID remains the same unless the user does a "factory reset" of the phone, which deletes the phone's data and settings.

A first electrical connector 33 of the first section 31 of the secondary device 30 is positioned in contact with a second electrical connector 37 of a second section 32 of the secondary device 30 to close a circuit. The key cylinder is transmitted from a wireless transceiver of the second section 32 of the secondary device 30 to a wireless transceiver of the primary device 25 when the circuit is closed on the secondary device 30. At the primary device 25, the key is matched with the key cylinder and the solution is tested to authenticate the primary device 25 to gain access for the authentication request. The primary device 25 is then able to access the data or access the secure site. The key cylinder is then preferably deleted.

The key is preferably discreet combination of numbers, letters of symbols generated within the authentication server 40 from proprietary or third party sources, that, when combined with the key cylinder at the primary device 25 constitute a state of trusted authentication. The key cylinder is preferably is preferably a discreet combination of numbers, letters of symbols generated within the authentication server 40 from proprietary or third party sources, that, when combined with the key at the primary device 25 constitute a state of trusted authentication. The solution is a desired outcome of matching the key and the key cylinder against an algorithm or other verification methodology.

In an example of the operation of the system, the primary device 25 calls to the authentication server 40, after a user name and password combination validation. The authentication server 40 identifies and validates the requesting primary device 25. This may include, but is not limited to, identification and validation through a Unique User ID ("UUID") Hash. The authentication server 40 pings (transmits a signal to) the secondary device 30. If the secondary device 30 is located and active (turned on), the secondary device 30 responds to the ping of the authentication server 40 with a GPS Location and an UUID Hash (the UUID Hash may be the same or different from the UUID Hash of the primary device 25). The authentication server 40 receives the response of the secondary device 30 followed by the authentication server 40 policy/database cross check, which includes: IF/THEN test based on ADMIN set ranges for GPS ("X" feet, etc.); the authentication server 40 Outputs "Yes/No"; If "No"-Fail message generated and sent to the primary device 25; Follow on attempts and cures dictated by Admin policies set by owner; and If "Yes", Retrieve key from Table. The authentication server 40 transmits the key and the solution to the primary device 25. The authentication server 40 transmits the key cylinder to the secondary device 30. When the secondary device 30 receives the key cylinder, the secondary device 30 generates and an "alert" (visual, audible, and/or kinetic). The end-user then physically closes the mechanical gap on the secondary device 30. Alternatively, in the absence of a working rotational device with male female friction connectors, other mechanisms are used that constitute a physical break in electronic pathway. The basic requirement is that the mechanism allows the end-user to mechanically "break" the connection between the software and hardware on the transmit side (e.g., Bluetooth). A rotational device is preferable to minimize the likelihood of accidentally sliding into an "On" position. When the switch is moved from the "Off" to the "On" position, an electrical contact is created between the first section 31 and the second section 32, and a pathway to deliver the key cylinder is created in the secondary device 30. A status alert notification (visual, audible, kinetic) is also preferably generated. At the end-user's discretion, an additional physical action (button, dial, plunger, twist, etc.) is taken to burst transmit the key cylinder to the primary device 25. The secondary device 30 transmits when a circuit is completed and the burst command action taken. The primary device 25 receives the key cylinder, and matches the key with received key cylinder, and then tests for the solution. If "Yes", the login is validated. The primary device 25 transmits "Yes" to the secondary device 30, and the secondary device 30 disposes of the key cylinder and notifies the primary device 25. When the primary device 25 receives a notification that the secondary device 30 has disposed of the key cylinder, the login is complete, and access is granted to the primary device 25.

Figure 5:
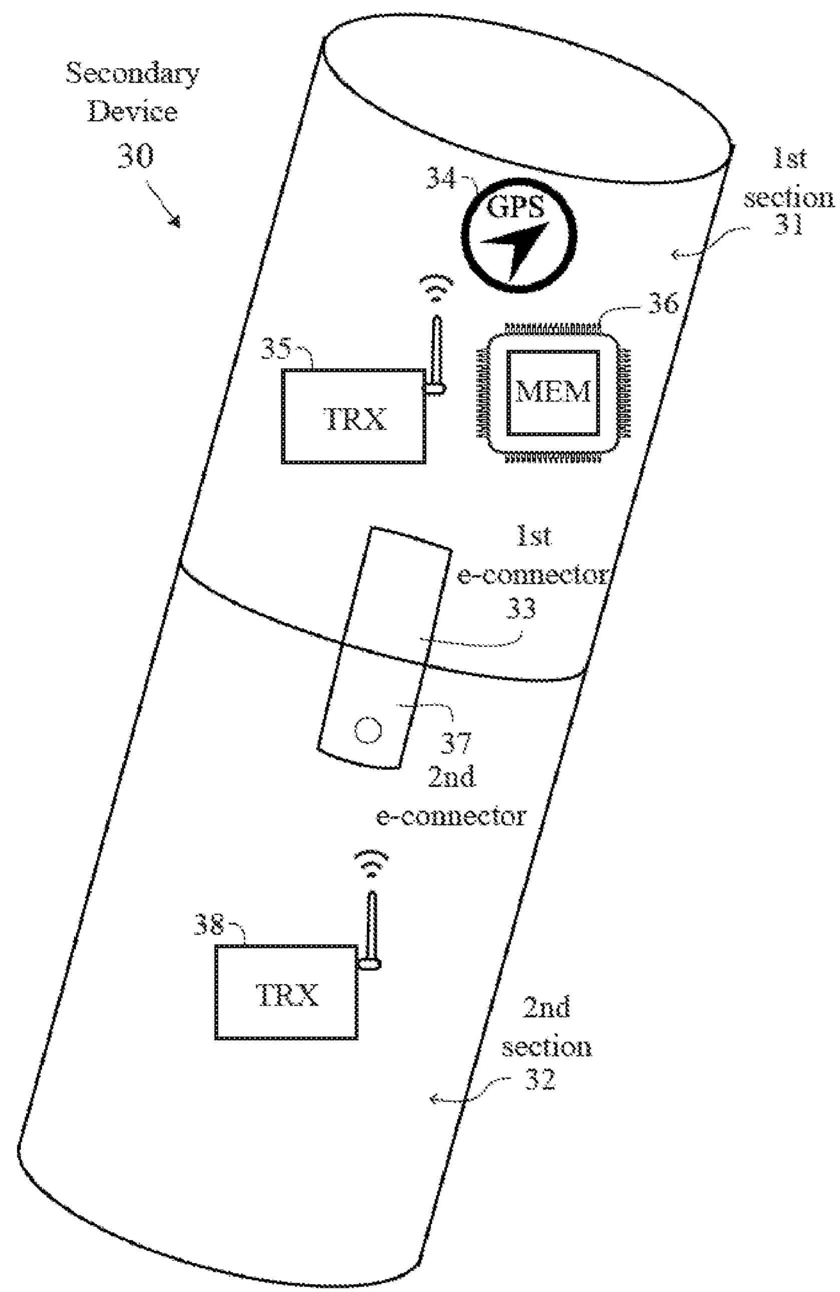
FIG. 5 is a block diagram of components for a secondary/slave device for a system for authentication utilizing a physical break in an electronic pathway.

As shown in FIG. 5, the first section 31 is movable in relation to the second section 32. The first section 31 preferably comprises a first electrical connector 33, a GPS component 34, a transceiver 35 for receiving authentication data over a network and a memory 36 for storing the authentication data. The second section 32 preferably comprises a second electrical connector 37 and a wireless transceiver for communicating with the primary device.

The authentication server 40 preferably comprises a key and a key cylinder. The key comprises a combination of numbers, letters and/or symbols and the key cylinder comprises a combination of numbers, letters and/or symbols. The primary device 25 is configured to transmit an authentication request to the authentication server 40. The authentication server 40 is configured to transmit a request to the secondary device 30 in response to the authentication request. The secondary device 30 is configured to transmit a GPS location and a UUID to the authentication server 40. Upon validation of the transmission from the secondary device 30, the authentication server 40 is configured to transmit the key and a solution to the primary device 25 and the key cylinder to the secondary device 30. The first section 31 is configured to position the first electrical connector 33 in contact with the second electrical connector 37 to close a circuit. The secondary device 30 is configured to transmit the key cylinder from the wireless transceiver 38 of the second section 32 to the primary device 40 when the circuit is closed. The primary device 40 is configured to match the key with the key cylinder and test the solution to authenticate the primary device 40 to gain access for the authentication request. Upon authentication, the primary device 25 receives the request or access to a secure site.

If the primary device 25 is a mobile communication device it can be selected from mobile phones, smartphones, tablet computers, PDAs and the like. Examples of smartphones and the device vendors include the IPHONE® smartphone from Apple, Inc., the DROID® smartphone from Motorola Mobility Inc., GALAXY S® smartphones from Samsung Electronics Co., Ltd., and many more. Examples of tablet computing devices include the IPAD® tablet computer from Apple Inc., and the XOOM™ tablet computer from Motorola Mobility Inc.

If the primary device 25 is a mobile communication device then a network utilized preferably originates from a mobile communication service provider (aka phone carrier) of the customer such as VERIZON, AT&T, SPRINT, T-MOBILE, and the like mobile communication service providers, provide the communication network for communication to the mobile communication device of the end user.

Wireless standards utilized include 802.11a, 802.11b, 802.11g, AX.25, 3G, CDPD, CDMA, GSM, GPRS, radio, microwave, laser, Bluetooth, 802.15, 802.16, and IrDA.

BLUETOOTH™ technology operates in the unlicensed 2.4 GHz band of the radio-frequency spectrum, and in a preferred embodiment the secondary device 30 and/or primary device 25 is capable of receiving and transmitting signals using BLUETOOTH™ technology. LTE Frequency Bands include 698-798 MHz (Band 12, 13, 14, 17); 791-960 MHz (Band 5, 6, 8, 18, 19, 20); 1710-2170 MHz (Band 1, 2, 3, 4, 9, 10, 23, 25, 33, 34, 35, 36, 37, 39); 1427-1660.5MH (Band 11, 21, 24); 2300-2700 MHz (Band 7, 38, 40, 41); 3400-3800 MHz (Band 22, 42, 43), and in a preferred embodiment the secondary device 30 and/or the primary device 25 is capable of receiving and transmitting signals using one or more of the LTE frequency bands. WiFi preferably operates using 802.11a, 802.11b, 802.11g, 802.11n communication formats as set for the by the IEEE, and in in a preferred embodiment the secondary device 30 and/or the primary device 25 is capable of receiving and transmitting signals using one or more of the 802.11 communication formats.

Figure 3:
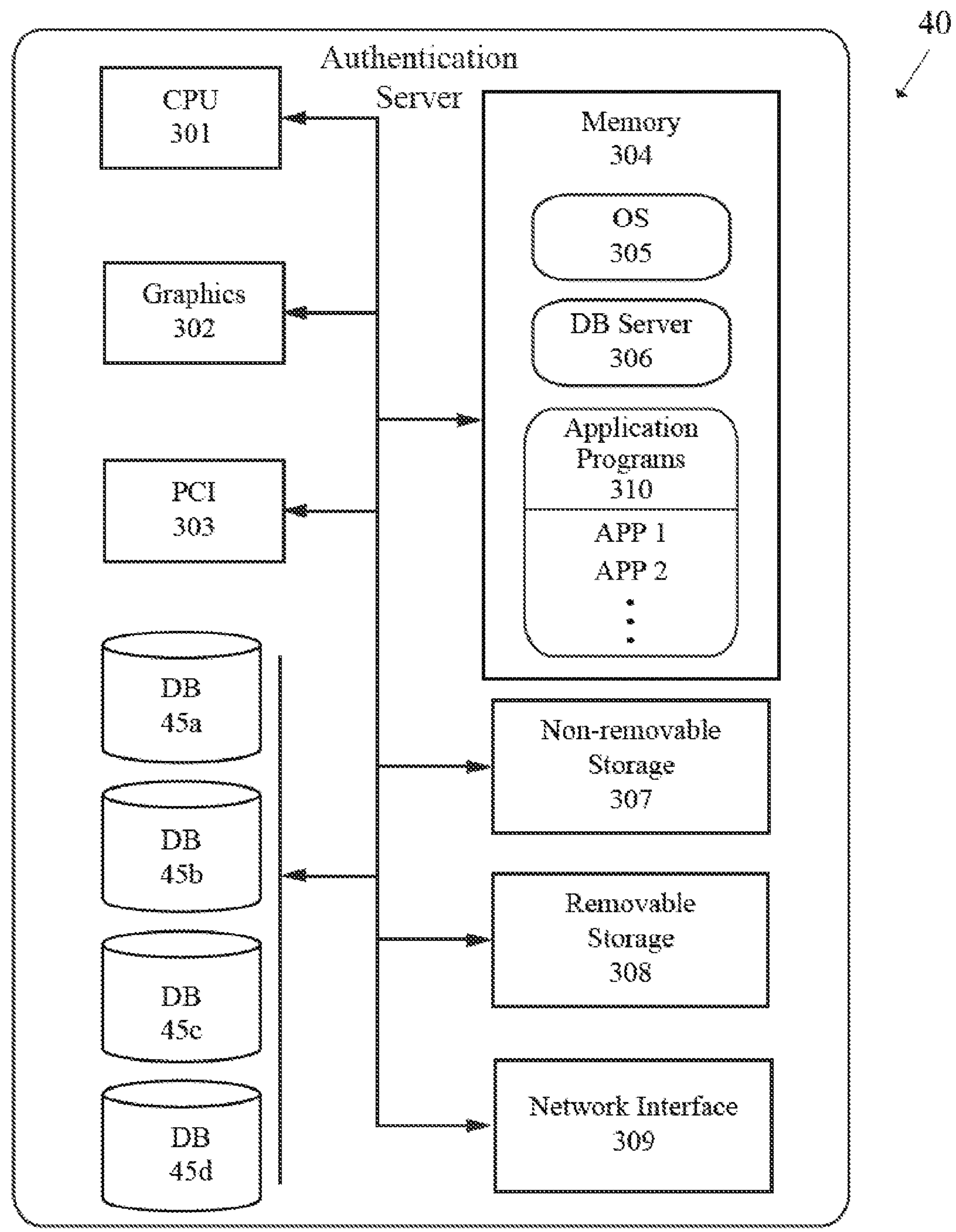
FIG. 3 is a block diagram of components for an authentication server utilized for a system for authentication utilizing a physical break in an electronic pathway.

FIG. 3 shows components of an authentication server 40 for an authentication server utilized for a system for authentication utilizing a physical break in an electronic pathway. The authentication server 40 preferably includes a CPU component 301, a graphics component 302, PCI/PCI Express 303, RAM memory 304, non-removable storage 307, removable storage 308, network Interface 309, including one or more connections to a fixed network 35, and a SQL database 45*a*-45*d*. Included in the memory 304, are the operating system 305, the SQL server 306, and computer programs 310. The authentication server 40 also preferably includes at least one computer program configured to receive data uploads and store the data uploads in the SQL database. The SQL server 306 comprises of other components of SQL server that can be installed separately from the SQL database engine.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. Databases that may be used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at the authentication server 40, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the authentication server 40 is most preferably HTTPS.

Figure 4:
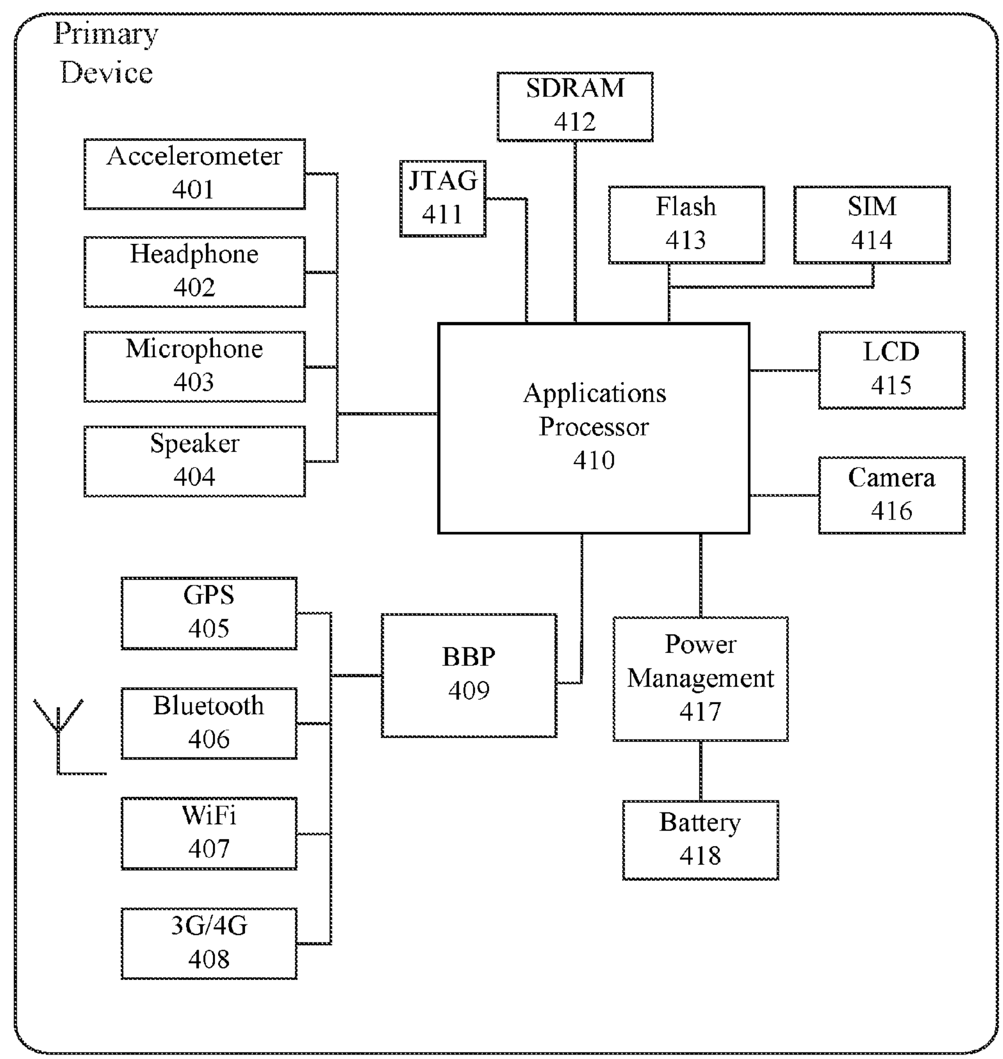
FIG. 4 is a block diagram of a primary device for a system for authentication utilizing a physical break in an electronic pathway.

As shown in FIG. 4, a typical mobile communication device 25 includes an accelerometer 401, a headphone jack 402, a microphone jack 403, a speaker 404, a GPS chipset 405, a Bluetooth component 406, a Wi-Fi component 407, a 3G/4G component 408, a Baseband Processor (for radio control) 409, an applications processor 410, a JTAG (debugger) 411, a SDRAM memory 412, a Flash memory 413, SIM card 414, LCD display 415, a camera 416, a power management circuit 417 and a battery or power source 418.

Figure 6:
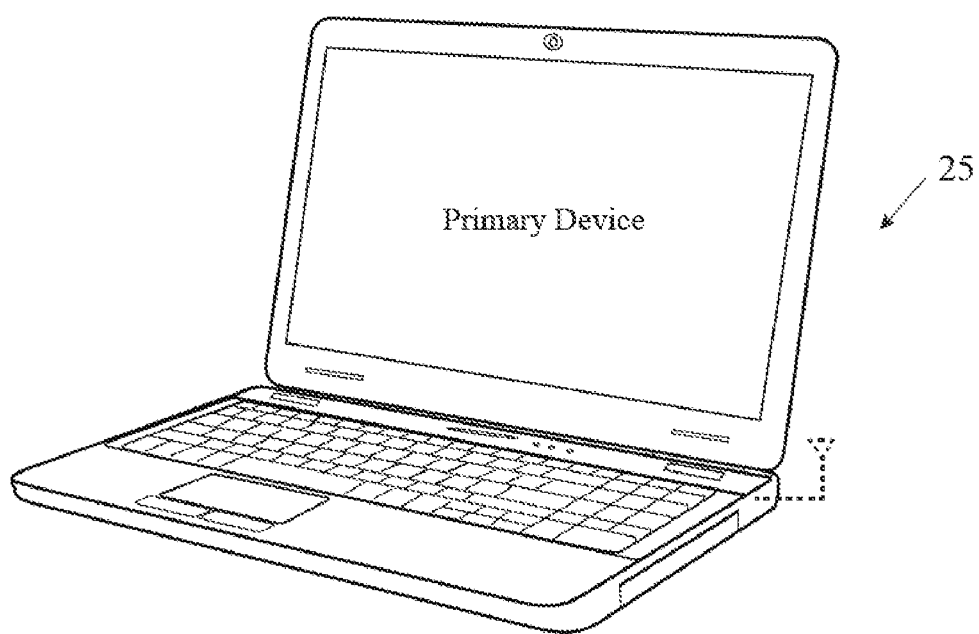
FIG. 6 is a block diagram of components for a primary/master device for a system for authentication utilizing a physical break in an electronic pathway.

FIG. 6 illustrates a laptop computer as the primary device 25.

Figure 7:
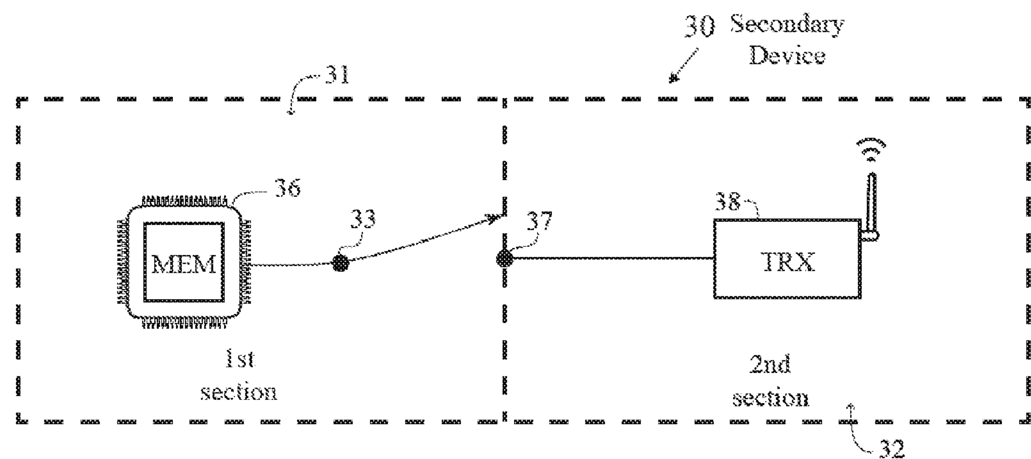
FIG. 7 is a circuit diagram for a secondary/slave device for a system for authentication utilizing a physical break in an electronic pathway having an open circuit.
Figure 8:
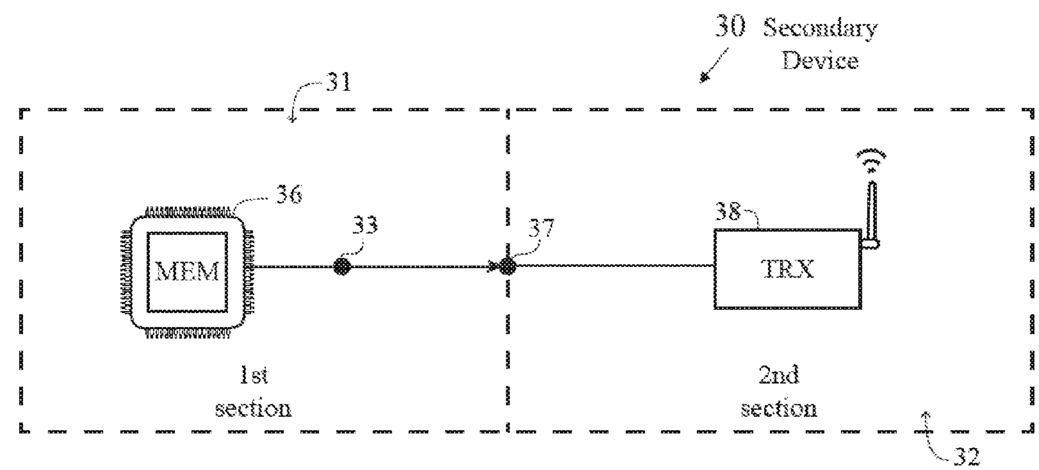
FIG. 8 is a circuit diagram for a secondary/slave device for a system for authentication utilizing a physical break in an electronic pathway having a closed circuit.

FIGS. 7 and 8 illustrate the circuit of the secondary device 30. The first section 31 and the second section 32 are moveable relative to each other. If the electrical connectors 33 and 37 positioned from each other, the circuit is open and the key cylinder, stored in the memory 36 of the first section 31, cannot be sent to the primary device 25. Once the electrical connectors 33 and 37 are positioned for connection, the circuit is closed and the key cylinder, stored in the memory 36 of the first section 31, is sent from the wireless transceiver 38 of the second section to the primary device 25.

Figure 9:
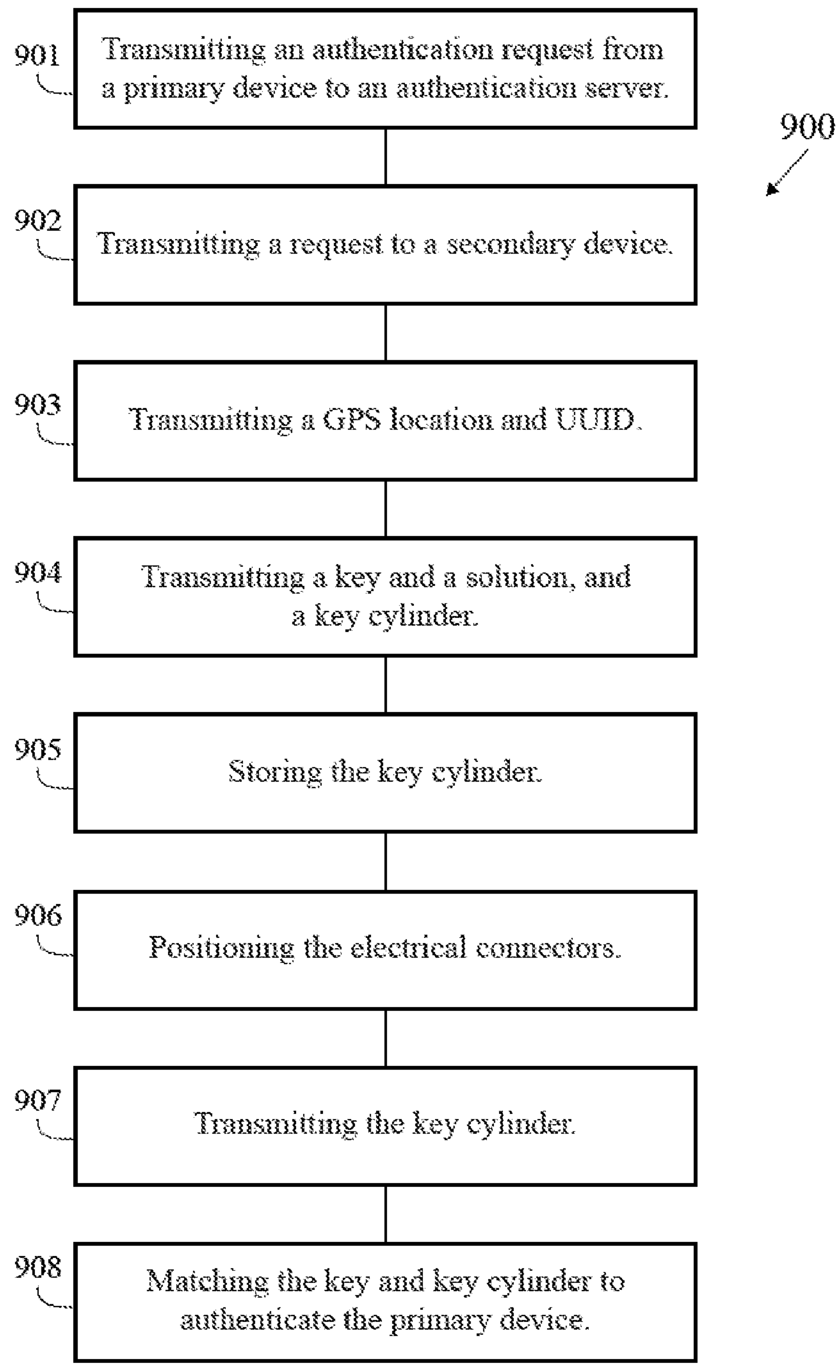
FIG. 9 is a flow chart for a method for authentication utilizing a physical break in an electronic pathway.

A flow chart for a method 900 for authentication utilizing a physical break in an electronic pathway is shown in FIG. 9. At block 901, an authentication request is transmitted from a primary device to an authentication server. At block 902, a request is transmitted to a secondary device for identification in response to the authentication request. At block 903, a GPS location and a UUID are transmitted to the authentication server. At block 904, the authentication server transmits a key and a solution to the primary device, and the authentication server transmits a key cylinder to a wireless transceiver of a first section of the secondary device upon validation of the secondary device. At block 905, the key cylinder is stored in a memory of the first section of the secondary device. At block 906, a first electrical connector of the first section of the secondary device is positioned in contact with a second electrical connector of a second section of the secondary device to close a circuit. At block 907, the key cylinder is transmitted from a wireless transceiver of the second section of the secondary device to a wireless transceiver of the primary device when the circuit is closed on the secondary device. At block 908, the key is matched with the key cylinder at the primary device and testing the solution to authenticate the primary device to gain access for the authentication request.

The key cylinder is preferably deleted at the secondary device upon the primary device matching the key with the key cylinder. Preferably, the secondary device validates its position relative to the position of the primary device.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. A system for authentication utilizing a physical break in an electronic pathway, the system comprising:

a primary device comprising a wireless transceiver;

a secondary device comprising a first section and a second section, the first section movable in relation to the second section, the first section comprising a first electrical connector, a Global positioning system ("GPS") component, a transceiver for receiving authentication data over a network and a memory for storing the authentication data, the second section comprising a second electrical connector, a wireless transceiver for communicating with the primary device; and an authentication server comprising a key and a key cylinder, the key comprising a combination of numbers, letters and/or symbols and the key cylinder comprising a combination of numbers, letters and/or symbols; wherein:

the primary device is configured to transmit an authentication request to the authentication server for access to secure data or a secure site;

the authentication server is configured to transmit a validation request to the secondary device in response to the authentication request;

the secondary device is configured to transmit a GPS location and an unique user identification ("UUID") to the authentication server in response to the validation request to indicate proximity of the secondary device to the primary device and the authenticity of the secondary device;

upon validation of the GPS location and the UUID of the secondary device, the authentication server is configured to transmit the key and a solution to the primary device and the key cylinder to the secondary device;

the secondary device is configured to generate a notification to a user to mechanically move the first section in relation to the second section when the key cylinder is received at the secondary device;

the first section is configured to move in relation to the second section to position the first electrical connector of the first section in contact with the second electrical connector of the second section to close a circuit on the secondary device;

upon the confirmation that the circuit is closed, the secondary device is configured to transmit the key cylinder to the primary device; and the primary device is configured to combine the key with the received key cylinder and test the solution to authenticate the primary device to gain access to the secure data or the secure site.

2. The system according to claim 1 wherein the secondary device is configured to delete the key cylinder upon the primary device successfully combining the key with the key cylinder and transmitting a success notice to the secondary device.

3. The system according to claim 1 wherein the second section utilizes a low energy communication format for communication with the primary device.

4. A method for authentication utilizing a physical break in an electronic pathway, the method comprising:

transmitting an authentication request from a primary device to an authentication server for access to secure data or a secure site;

transmitting a validation request to a secondary device for identification and proximity to the primary device in response to the authentication request;

transmitting a global positioning system ("GPS") location and an unique user identification ("UUID") to the authentication server in response to the validation request to indicate proximity of the secondary device to the primary device and the authenticity of the secondary device;

transmitting from the authentication server a key and a solution to the primary device, and a key cylinder to a wireless transceiver of a first section of the secondary device upon validation of the secondary device using GPS location and the UUID;

storing the key cylinder in a memory of the first section of the secondary device;

generating a notification from the secondary device to a user to mechanically move the first section in relation to a second section of the secondary device when the key cylinder is received at the secondary device;

positioning a first electrical connector of the first section of the secondary device in contact with a second electrical connector of a second section of the secondary device to close a circuit of the secondary device;

transmitting the key cylinder from a wireless transceiver of the second section of the secondary device to a wireless transceiver of the primary device when the circuit is closed on the secondary device; and combining the key with the received key cylinder at the primary device and testing the solution to authenticate the primary device to gain access to the secure data or the secure site.

5. The method according to claim 4 further comprising deleting the key cylinder at the secondary device upon the primary device successfully combining the key with the key cylinder and transmitting a success notice to the secondary device.

6. The method according to claim 4 wherein the second section utilizes a low energy communication format for communication with the primary device.

* * * * *